US012800733B2

(12) United States Patent
Chen et al.

(10) Patent No.: US 12,800,733 B2
(45) Date of Patent: Nov. 17, 2026

(54) OPTICAL RADAR AND OPTICAL SIGNAL PICKUP METHOD THEREOF

(71) Applicant: INDUSTRIAL TECHNOLOGY RESEARCH INSTITUTE, Hsinchu (TW)

(72) Inventors: Chih-Chun Chen, Kaohsiung City (TW); Yi-Chi Lee, Taichung City (TW); Chia-Yu Hu, Tainan City (TW); Ji-Bin Horng, Tainan City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1001 days.

(21) Appl. No.: 18/071,718

(22) Filed: Nov. 30, 2022

(65) Prior Publication Data

US 2024/0077593 A1 Mar. 7, 2024

(30) Foreign Application Priority Data

Sep. 5, 2022 (TW) .................................. 111133560

(51) Int. Cl.
*G01S 7/487* (2006.01)
*G01S 7/48* (2006.01)

(52) U.S. Cl.
CPC .......... *G01S 7/4876* (2013.01); *G01S 7/4804* (2013.01)

(58) Field of Classification Search
CPC ...... G01S 7/4876; G01S 7/4804; G01S 17/42; G01S 17/89; G01S 17/931
See application file for complete search history.

(56) References Cited

U.S. PATENT DOCUMENTS 5,612,779 A * 3/1997 Dunne .................... G01S 17/10 342/134
6,590,429 B2 * 7/2003 Choi ...................... H03K 5/125 327/563

(Continued)

FOREIGN PATENT DOCUMENTS

CN 113841065 A 12/2021
TW 201643463 A 12/2016

(Continued)

OTHER PUBLICATIONS

Jantzi et al. "Spatial and temporal domain filtering for underwater lidar" (Year: 2021).*

(Continued)

*Primary Examiner* — Assres H Woldemaryam
(74) *Attorney, Agent, or Firm* — Birch, Stewart, Kolasch & Birch, LLP

(57) ABSTRACT

An optical radar includes an optical-signal receiving unit and an optical-signal pickup unit. The optical-signal receiving unit is configured to receive a reflected light. The optical-signal pickup unit is coupled to the optical-signal receiving unit and includes a first optical-signal filtering circuit and a second optical-signal filtering unit. The first optical-signal filtering circuit is configured to filter out a first interference pulse of the reflected light, wherein the first interference pulse has a first interference voltage value higher than a reference voltage. The second optical-signal filtering circuit is coupled to the first optical-signal filtering circuit and configured to generate a clock signal comprising a clock pulse; and filter out a second interference pulse that does not match the clock pulse in time point from the reflected light.

22 Claims, 5 Drawing Sheets

(56) References Cited

U.S. PATENT DOCUMENTS

| | | | | |
|---|---|---|---|---|
| 7,825,697 | B2 * | 11/2010 | Hsiung | H03K 5/1252 327/34 |
| 7,969,558 | B2 * | 6/2011 | Hall | H01S 5/0428 356/141.5 |
| 8,264,401 | B1 * | 9/2012 | Kavaler | G01S 13/14 342/136 |
| 9,812,838 | B2 * | 11/2017 | Villeneuve | H01S 3/094003 |
| 10,338,201 | B2 | 7/2019 | Slobodyanyuk et al. | |
| 11,150,348 | B2 | 10/2021 | Allen et al. | |
| 11,614,542 | B1 * | 3/2023 | Nikitin | G01S 17/89 356/4.01 |
| 2005/0277826 | A1 * | 12/2005 | Dunseath | A61B 5/369 600/410 |
| 2013/0329466 | A1 * | 12/2013 | Telefus | H02M 1/4258 363/21.12 |
| 2017/0082737 | A1 * | 3/2017 | Slobodyanyuk | G01S 7/497 |
| 2017/0212219 | A1 | 7/2017 | Spuler et al. | |
| 2018/0259645 | A1 | 9/2018 | Shu et al. | |
| 2018/0284229 | A1 | 10/2018 | Liu et al. | |
| 2018/0306926 | A1 | 10/2018 | LaChapelle et al. | |
| 2019/0257947 | A1 | 8/2019 | Zhang et al. | |
| 2020/0124699 | A1 * | 4/2020 | Meissner | G01S 13/0209 |
| 2020/0158825 | A1 * | 5/2020 | Meissner | G01S 17/931 |
| 2020/0264286 | A1 | 8/2020 | Dussan et al. | |
| 2021/0026000 | A1 | 1/2021 | Pennecot et al. | |
| 2021/0116536 | A1 * | 4/2021 | Brosche | G01S 13/343 |
| 2022/0018941 | A1 * | 1/2022 | Druml | G01S 7/4863 |
| 2022/0148488 | A1 * | 5/2022 | Wang | G09G 3/20 |
| 2022/0404456 | A1 * | 12/2022 | Gottinger | G01S 7/354 |

FOREIGN PATENT DOCUMENTS

| | | | |
|---|---|---|---|
| TW | 201835603 | A | 10/2018 |
| TW | 201840150 | A | 11/2018 |
| TW | 202012956 | A | 4/2020 |
| TW | 202041883 | A | 11/2020 |
| TW | 202120952 | A | 6/2021 |
| TW | 202134685 | A | 9/2021 |
| TW | 1759137 | B | 3/2022 |
| TW | 202220224 | A | 5/2022 |
| WO | WO 2022/055833 | A1 | 3/2022 |

OTHER PUBLICATIONS

Taiwanese Office Action and Search Report for corresponding Taiwanese Application No. 111133560, dated Apr. 11, 2023.

Chen et al., "Investigation of Anti-Interference Characteristics of Frequency-Hopping LiDAR", IEEE Photonics Technology Letters, Dec. 15, 2021, vol. 33, No. 24, pp. 1443-1446.

Hwang et al., "Mutual Interferences of a True-Random LiDAR With Other LiDAR Signals", IEEE, 2020, vol. 8, pp. 124123-124133.

Kim et al., "Ultrashort pulse laser slicing of semiconductor crystal", Proceedings of SPIE, 2016, vol. 9983, pp. 99831B-1 to 99831B-6.

* cited by examiner

OPTICAL RADAR AND OPTICAL SIGNAL PICKUP METHOD THEREOF

This application claims the benefit of Taiwan application Serial No. 111133560, filed Sep. 5, 2022, the subject matter of which is incorporated herein by reference.

TECHNICAL FIELD

The disclosure relates to an optical radar and an optical-signal pickup method thereof.

BACKGROUND

An optical radar also is called as LiDAR, could detect a speed, a range, and an angle of a moving object. The optical radar is a sensing technology that emits low-power, eye-safe laser beam for pulse measurement, and measures time it takes for the laser beam to complete a round trip from a sensor to a target. The data result is configured to generate a 3D point-cloud map, and provide both spatial location and depth information to identify, classify and track the moving object. However, a reflected light received by the optical radar contains a lot of interference noise, which could reduce an accuracy of the 3D point-cloud map. Therefore, how to improve the aforementioned conventional problems is one of the goals of those skilled in the art.

SUMMARY

In an embodiment of the disclosure, an optical radar is provided. The optical radar includes an optical-signal receiving unit and an optical-signal pickup unit. The optical-signal receiving unit is configured to receive a reflected light. The optical-signal pickup unit is coupled to the optical-signal receiving unit and includes a first optical-signal filtering circuit and a second optical-signal filtering unit. The first optical-signal filtering circuit is configured to filter out a first interference pulse of the reflected light, wherein the first interference pulse has a first interference voltage value higher than a reference voltage. The second optical-signal filtering circuit is coupled to the first optical-signal filtering circuit and configured to generate a clock signal including a clock pulse; and filter out a second interference pulse of the reflected light that does not match the clock pulse in time point.

In another embodiment of the disclosure, an optical-signal pickup method for an optical radar includes the following steps: receiving a reflected light; filtering out a first interference pulse of the reflected light, wherein the first interference pulse has a first interference voltage value higher than a reference voltage; generating a clock signal including a pulse; and filtering out a second interference pulse of the reflected light that does not match the clock pulse in time point.

Numerous objects, features and advantages of the disclosure will be readily apparent upon a reading of the following detailed description of embodiments of the disclosure when taken in conjunction with the accompanying drawings. However, the drawings employed herein are for the purpose of descriptions and should not be regarded as limiting.

BRIEF DESCRIPTION OF THE DRAWINGS

The above objects and advantages of the disclosure will become more readily apparent to those ordinarily skilled in the art after reviewing the following detailed description and accompanying drawings, in which.

DESCRIPTION OF THE EMBODIMENTS

Figure 1:
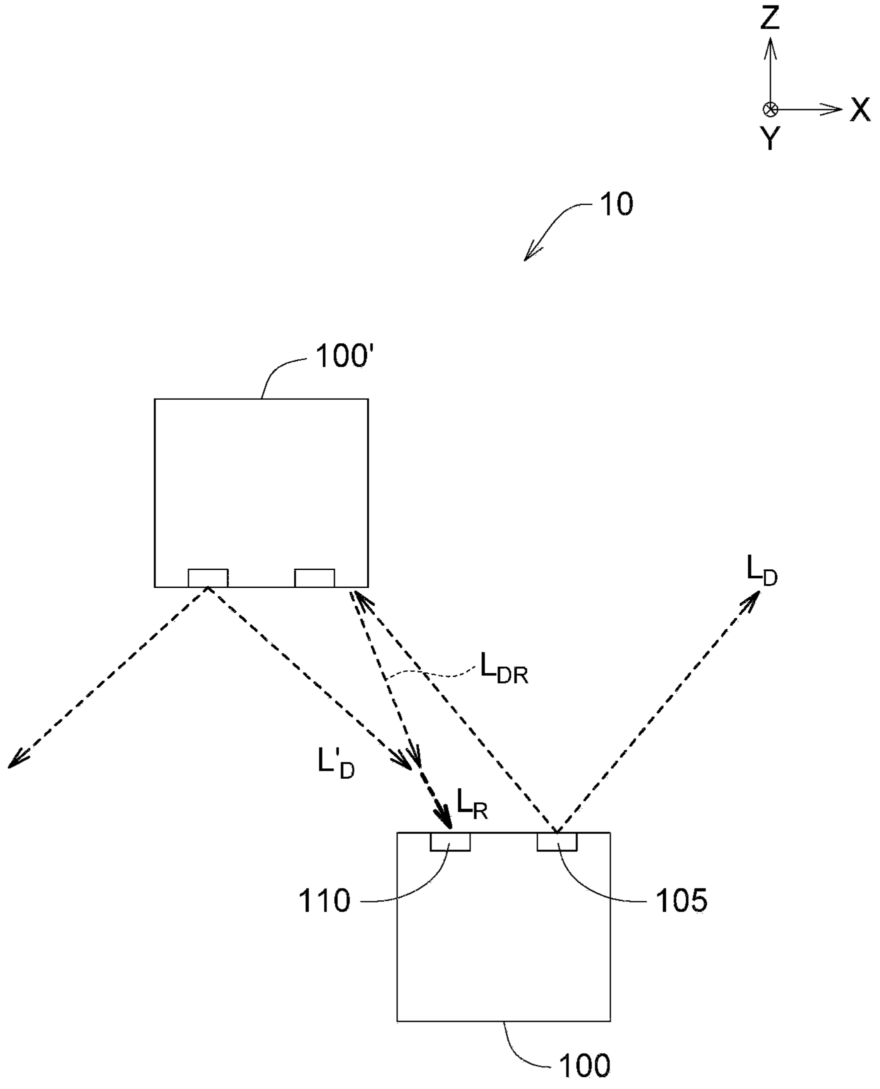
FIG. 1 shows a schematic diagram of an optical radar system according to an embodiment of the disclosure.
Figure 2:
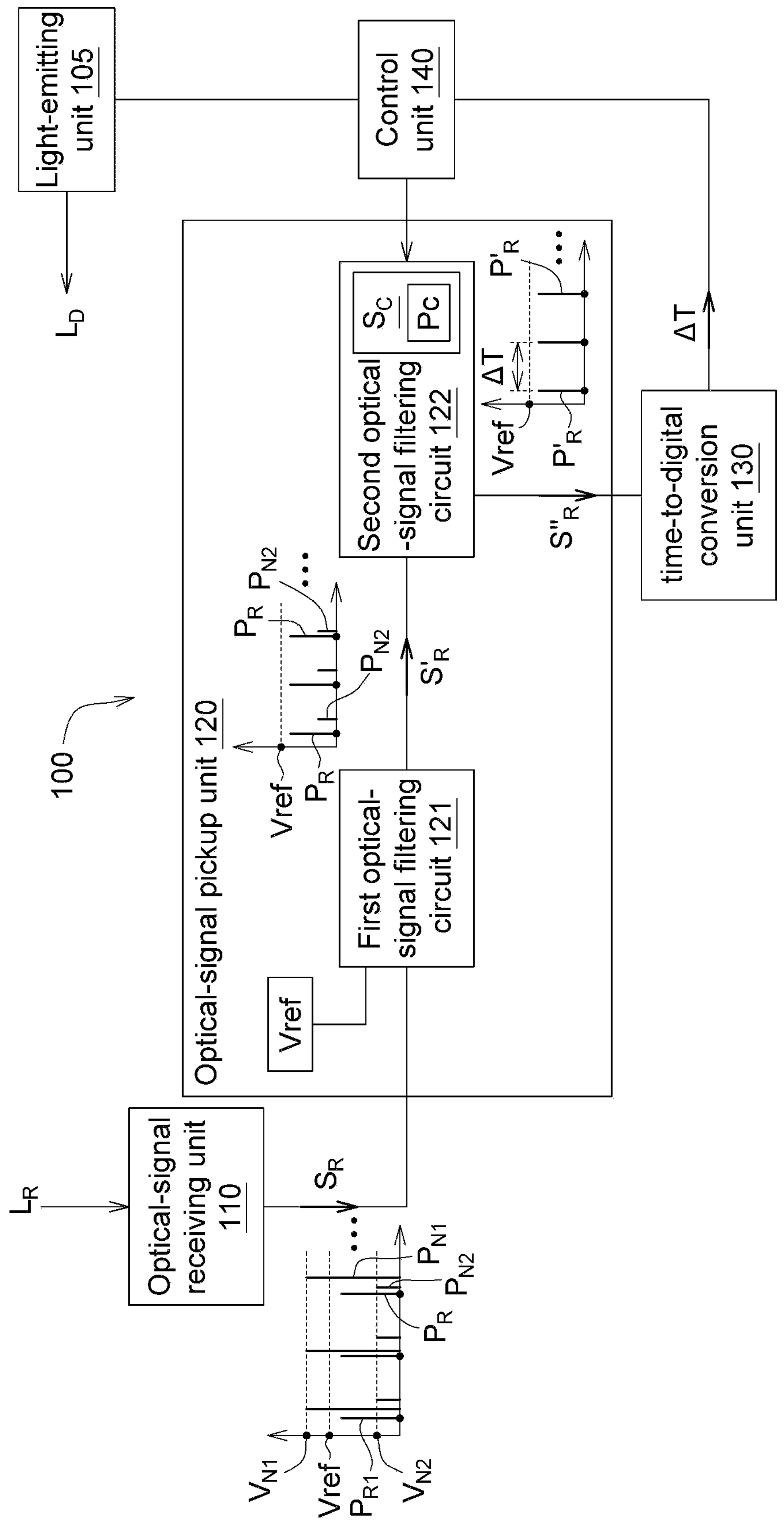
FIG. 2 shows a functional block diagram of the optical radar of FIG. 1.

Referring to FIGS. 1 to 2. FIG. 1 shows a schematic diagram of an optical radar system 10 according to an embodiment of the present disclosure, and FIG. 2 shows a functional block diagram of the optical radar 100 of FIG. 1.

As shown in FIG. 1, an optical radar system 10 includes at least one optical radar 100 and at least one optical radar 100'. The optical radar system 100' may also include the structures the same as or similar to that of the optical radar 100, or the optical radar 100' and the optical radar 100 are the same in structure. The optical radar 100 at least includes a light-emitting unit 105 and an optical-signal receiving unit 110. In addition, the optical radar 100 could also be replaced by the optical radar 200 of FIG. 3A. The optical radar system 10 may be disposed in a transportation, such as an automobile (for example, a self-driving vehicle), a truck, a truck, etc.

The light-emitting unit 105 is, for example, a laser beam emitting unit. The light-emitting unit 105 could emit a detection light $L_D$ (for example, a laser beam), wherein the detection light $L_D$ is reflected from a reflector (for example, the optical radar 100' or other reflectors) to become a reflected light $L_{DR}$, and the reflected light $L_{DR}$ is received by the optical-signal receiving unit 110. In addition, the detection light $L'_D$ emitted by the optical radar 100' is also received by the optical radar 100. Therefore, a reflected light $L_R$ received by the optical radar 100 includes the reflected light $L_{DR}$ of the detection light $L_D$ emitted by the optical radar 100 itself and the detection light $L'_D$ emitted by the optical radar 100'.

The reflected light $L_{DR}$ in the reflected light $L_R$ is a to-be-analyzed signal by the optical radar 100, and the optical radar 100 obtains a point-cloud map by analyzing the signal of the reflected light LDR. The detection light $L'_D$ emitted by the optical radar 100' is a noise for subsequent signal processing, and will interfere with the accuracy of the subsequent point-cloud map. The optical radar 100 of the present embodiment in the present disclosure could filter out signals other than the reflected light $L_{DR}$ in the reflected light $L_R$. The structure of the optical radar 100 and the corresponding noise filtering mechanism are further illustrated below.

As shown in FIG. 2, the optical radar 100 includes an optical-signal receiving unit 110 and an optical-signal pickup unit 120. The optical-signal receiving unit 110 is configured for receiving the reflected light $L_R$. The optical-signal pickup unit 120 is coupled to the optical-signal receiving unit 110 and includes a first optical-signal filtering circuit 121 and a second optical-signal filtering circuit 122. The first optical-signal filtering circuit 121 is configured for filtering out at least one first interference pulse $P_{N1}$ of the reflected light $L_R$, wherein the first interference pulse $P_{N1}$ has a first interference voltage value $V_{N1}$ higher than a reference voltage $V_{ref}$. The second optical-signal filtering circuit 122 is coupled to the first optical-signal filtering circuit 121 and is configure for: generating a clock signal $S_C$ having at least one clock pulse $P_C$, and filtering out at least one second interference pulse $P_{N2}$ that does not match the clock pulse $P_C$ in time point from the reflected light $L_R$. As a result, the optical radar 100 could filter out at least one interference pulse of the reflected light $L_R$, and accordingly it could prevent such interference pulses from negatively affecting subsequent signal processing.

As shown in FIG. 2, the reflected-light signal $S_R$ of the reflected light $L_R$ may include a first interference pulse $P_{N1}$, a second interference pulse $P_{N2}$ and a first reflected pulse $P_R$, wherein the first interference pulse $P_{N1}$ is the signal of the detection light $L'_D$ detected by the optical radar 100', the first reflected pulse $P_R$ is a reflected signal of the detection light $L_D$ emitted by the optical radar 100 reflected from the reflector (for example, the optical radar 100'), and the second interference pulse $P_{N2}$ is other weaker signal received by the optical radar 100. Due to the first interference pulse $P_{N1}$ being the signal of the detection light $L'_D$ detected by the optical radar 100', the signal intensity of the detection light $L'_D$ is not reduced by the reflector, and thus the first interference pulse $P_{N1}$ has a high signal intensity. For example, the intensity of the first interference pulse $P_{N1}$ is greater than the intensity of the second interference pulse $P_{N2}$. In terms of voltage value, the first interference voltage value $V_{N1}$ of the first interference pulse $P_{N1}$ is higher than the second interference voltage value $V_{N2}$ of the second interference pulse $P_{N2}$. Through the optical-signal pickup method of the embodiment of the present disclosure, the noise in the reflected-light signal $S_R$ of the reflected light $L_R$ whose intensity is higher and lower than that of the first reflected pulse $P_R$ could be filtered out, and accordingly most, almost or all of the remaining signals are the first reflected pulse $P_R$.

As shown in FIG. 2, the reference voltage $V_{ref}$ ranges between the first interference voltage value $V_{N1}$ of the first interference pulse $P_{N1}$ and the second interference voltage value $V_{N2}$ of the second interference pulse $P_{N2}$. For example, the reference voltage $V_{ref}$ is lower than the first interference voltage value $V_{N1}$ but higher than the second interference voltage value $V_{N2}$. In an embodiment, the reference voltage $V_{ref}$ is, for example, a voltage value ranging between 0 to 3.3 volts (V).

As shown in FIG. 2, the optical radar 100 further includes a time-to-digital conversion unit (TDC) 130 and a control unit 140. The control unit 140 is electrically coupled to the optical-signal receiving unit 110. The optical-signal receiving unit 110, the optical-signal pickup unit 120, the time-to-digital conversion unit 130 and/or the control unit 140 are, for example, physical circuits formed by at least one semiconductor process. In addition, at least two of the optical-signal receiving unit 110, the optical-signal pickup unit 120 and the time-to-digital conversion unit 130 may be integrated into a single unit, or integrated into the control unit 140. In an embodiment, the control unit 140 is, for example, a controller, such as a Microcontroller Unit (MCU), or the control unit 140 is, for example, a processor.

As shown in FIG. 2, the time-to-digital conversion unit 130 is coupled to the optical-signal pickup unit 110 and configured to obtain at least one time difference $\Delta T$ of the first reflected pulses $P_R$. For example, the time difference between the $n^{th}$ first reflected pulse $P_R$ and the $1^{st}$ first reflected pulse $P_R$, wherein n is a positive integer equal to or greater than 2, or the time difference between the (m+1)th first reflected pulse $P_R$ and the $m^{th}$ first reflected pulse $P_R$, where m is a positive integer equal to or greater than 1. The time-to-digital conversion unit 130 may transmit the time difference $\Delta T$ to the control unit 140. In an embodiment, the optical time-to-digital conversion unit 130 may convert the time difference $\Delta T$ into a signal conforming to the SPI (Serial Peripheral Interface) specification according to the SPI protocol, and transmits it to the control unit 140.

The control unit 140 may generate a point-cloud map according to the time differences $\Delta T$ between the first reflected pulses $P_R$. In an embodiment, the point-cloud includes information, such as an X coordinate value, a Y coordinate value, a depth value D and/or a time stamp, etc., wherein the X coordinate value and the Y coordinate value are the XY plane coordinates of a target in the detection image, the depth value D is a distance (for example, along a Z-axis of FIG. 1) between the target of the detection image and the optical radar 100, the time difference $\Delta T$ could be used for calculating the depth value D, and the time stamp is, for example, the time point of the detection image being detected. Due to most or all of the noise has been filtered out, the time difference $\Delta T$ represents the first reflected pulse $P_R$ with the high reliability, so that the resulting point-cloud map has high accuracy.

A point-cloud is a collection of massive points that express a spatial distribution of the target and the characteristics of a target surface under a same spatial reference system. After obtaining the spatial coordinates of each sampling point on the target surface, the collection of several feature points obtained is called "point-cloud". A point-cloud is a large dataset consisting of three-dimensional (3D) point data, and obtained by the laser beam measurement. Point-cloud produced by automotive optical radar contains raw data of the surrounding environment which is obtained by scanning the moving target (for example, vehicles and/or people) as well as a stationary target (for example, buildings, trees, and other permanent structures). The point-cloud containing the data points could then be transformed by a software system to create a 3D image of a specific area for the optical radar.

Figure 3A:
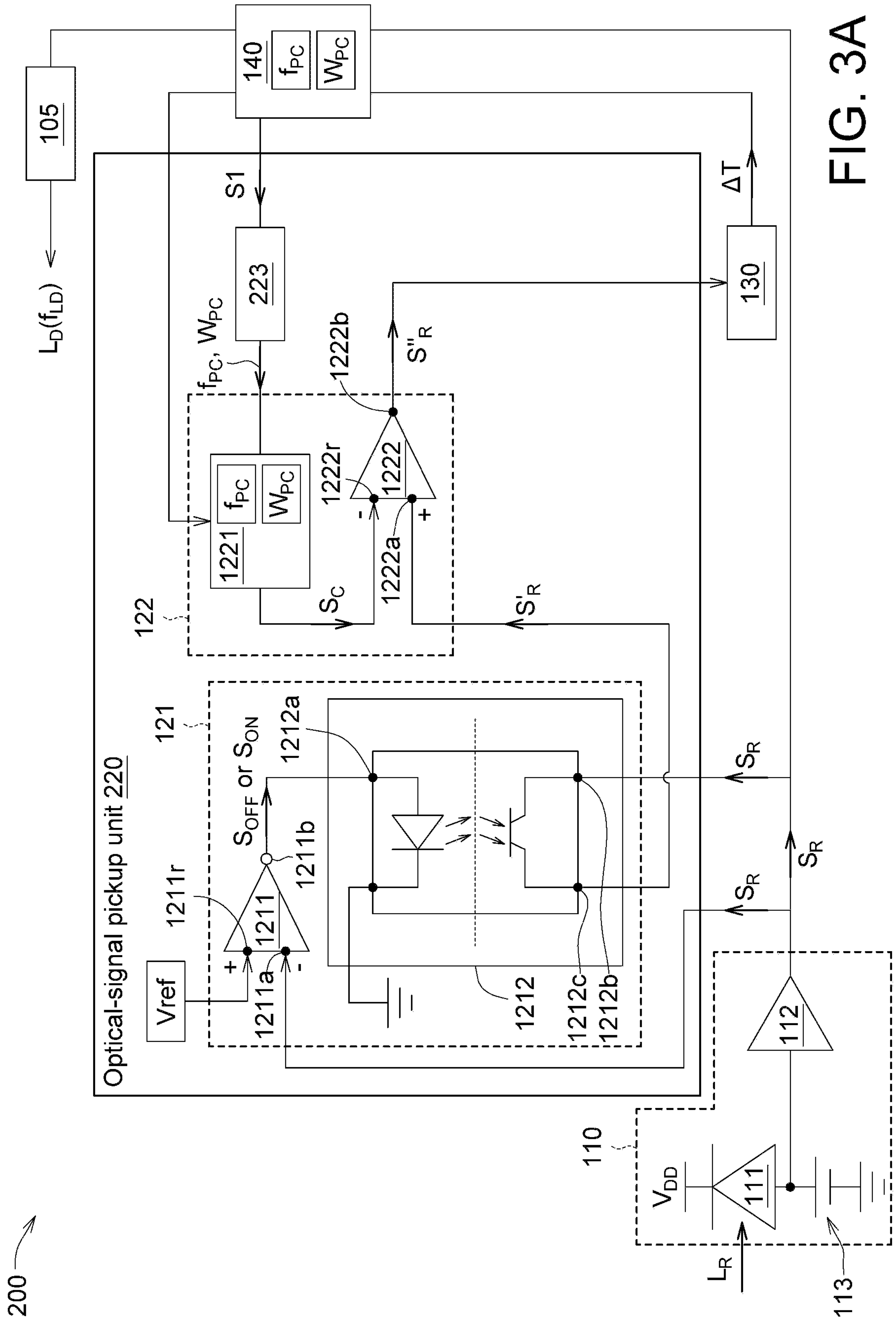
FIG. 3A shows a functional block diagram of an optical radar according to another embodiment of the disclosure.
Figure 3B:
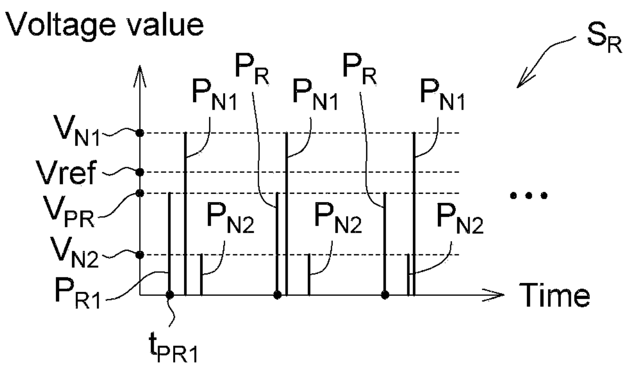
FIG. 3B shows a schematic diagram of the reflected-light signal $S_R$ of FIG. 3A.
Figure 3C:
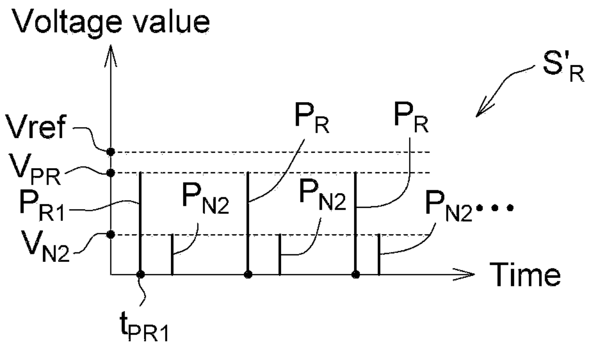
FIG. 3C shows a schematic diagram of the reflected-light signal S'R of FIG. 3A.
Figure 3D:
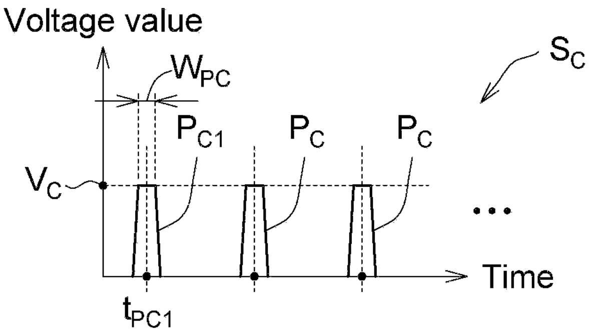
FIG. 3D shows a schematic diagram of the clock signal $S_C$ of FIG. 3A.
Figure 3E:
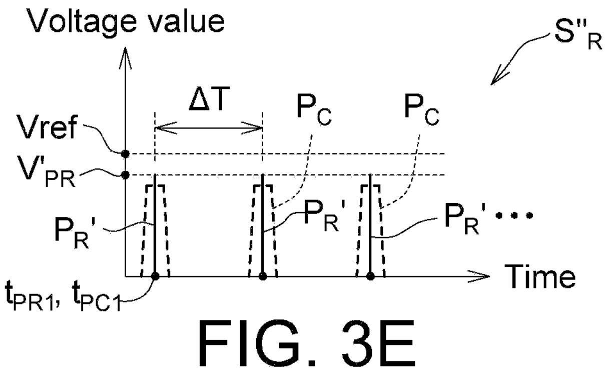
FIG. 3E shows a schematic diagram of the reflected-light signal $S''_R$ of FIG. 3A.

Referring to FIGS. 3A to 3E, FIG. 3A shows a functional block diagram of an optical radar 200 according to another embodiment of the present disclosure, FIG. 3B shows a schematic diagram of the reflected-light signal $S_R$ of FIG. 3A, FIG. 3C shows a schematic diagram of the reflected-light signal $S'_R$ of FIG. 3A, FIG. 3D shows a schematic diagram of the clock signal $S_C$ of FIG. 3A, and FIG. 3E shows a schematic diagram of the reflected-light signal $S''_R$ of FIG. 3A. In order to facilitate the understanding of the corresponding relationship between the clock pulse $P_C$ and the second reflected pulse P'R, the clock pulse $P_C$ is drawn with a dashed line in FIG. 3E; however, in fact, the clock pulse $P_C$ may not appear in the reflected-light signal $S''_R$.

As shown in FIG. 3A, the optical radar 200 includes the optical-signal receiving unit 110, an optical-signal pickup unit 220, the time-to-digital conversion unit 130 and the control unit 140. The optical-signal receiving unit 110, the optical-signal pickup unit 220, the time-to-digital conversion unit 130 and/or the control unit 140 are, for example, physical circuits formed by at least one semiconductor process.

As shown in FIGS. 3A and 3B, the optical-signal receiving unit 110 includes a photodiode 111 and a first amplifier 112 electrically coupled to the photodiode 111. For example, an input terminal of the photodiode 111 is coupled to a driving voltage $V_{DD}$, an output terminal of the photodiode 111 is coupled to a positive electrode of a resistor 113, a negative electrode of the resistor 113 is grounded, and the first amplifier 112 is coupled to a wire between the resistor 113 and the photodiode 11 for receiving the sensing signal of the photodiode 111. The photodiode 111 is, for example, an avalanche photodiode (APD) or other electronic component capable of sensing light signal. The photodiode 111 is configured for sensing the reflected light $L_R$ and outputting the reflected-light signal $S_R$ in response. The first amplifier 112 is configured for amplifying the reflected-light signal $S_R$ of the photodiode 111.

As shown in FIG. 3A, the optical-signal pickup unit 220 includes a first optical-signal filtering circuit 121, a second optical-signal filtering circuit 122 and a decoding unit 223. The decoding unit 223 is, for example, a physical circuit formed by at least one semiconductor process. In an embodiment, at least two of the first optical-signal filtering circuit 121, the second optical-signal filtering circuit 122 and the decoding unit 223 could also be integrated into a single unit.

As shown in FIG. 3A, the first optical-signal filtering circuit 121 includes a second amplifier 1211 and an optical coupler 1212 coupled to the second amplifier 1211. In an embodiment, the second amplifier 1211 is, for example, a reversing amplifier, and the optical coupler 1212 is, for example, an optical switch.

As shown in FIG. 3A, the second amplifier 1211 has a reference terminal 1211*r*, an input terminal 1211*a* and an output terminal 1211*b*, wherein the reference terminal 1211*r* is electrically coupled to the reference voltage $V_{ref}$, and the input terminal 1211*a* is electrically coupled to the optical-signal receiving unit 110, for example, electrically coupled to the first amplifier 112, and the output terminal 1211*b* is electrically coupled to the optical coupler 1212. The second amplifier 1211 could output corresponding signals (for example, the turn-off signal $S_{OFF}$ or the turn-on signal $S_{ON}$) according to the pulses of different intensities in the reflected-light signal $S_R$. The optical coupler 1212 has a switch function, and could be turned off in response to receiving the turn-off signal $S_{OFF}$ to block the output of the corresponding signal, or be turned on in response to receiving the turn-on signal $S_{ON}$ to pass the output of the corresponding signal. Under the cooperation of the second amplifier 1211 and the optical coupler 1212, the reflected-light signal $S'_R$ is generated according to the reference voltage $V_{ref}$ and the reflected-light signal $S_R$, and it will be further described below.

As shown in FIGS. 3A to 3C, the second amplifier 1211 is configured for receiving the input of the reflected-light signal $S_R$ of the reflected light $L_R$ and coupling the reference voltage $V_{ref}$, and is configured for outputting the turn-off signal $S_{OFF}$ (for example, a low-level signal) when the first interference voltage value $V_{N1}$ of the first interference pulse $P_{N1}$ of the reflected-light signal $S_R$ is higher than the reference voltage $V_{ref}$. The optical coupler 1212 is coupled to the second amplifier 1211 and configured to receive the input of the reflected-light signal $S_R$ and block the output of the first interference pulse $P_{N1}$ in response to receiving the turn-off signal $S_{OFF}$. In addition, the second amplifier 1211 is further configured to output the turn-on signal $S_{ON}$ when the reflected-pulse voltage value $V_{PR}$ of the first reflected pulse $P_R$ of the reflected optical-signal $S_R$ and the second interference voltage value $V_{N2}$ of the second interference pulse $P_{N2}$ are not higher than the reference voltage $V_{ref}$. The optical coupler 1212 is further configured to be turned on in response to receiving the turn-on signal $S_{ON}$ for outputting (or pass) the first reflected pulse $P_R$ and the second interference pulse $P_{N2}$. As a result, as shown in FIG. 3C, the reflected-light signal $S'_R$ includes the first reflected pulse $P_R$ and second interference pulse $P_{N2}$ that are outputted or passed, but does not include the first interference pulse $P_{N1}$ that is turned off.

As mentioned above, the optical-signal pickup unit 120 picks up the second interference pulse $P_{N2}$ and the first reflected pulse $P_R$ based on the signal intensity.

As shown in FIG. 3A, the second optical-signal filtering circuit 122 includes a clock signal generator 1221 and a third amplifier 1222 coupled to the clock signal generator 1221. The third amplifier 1222 is, for example, an operational amplifier.

As shown in FIGS. 3A and 3D, the third amplifier 1222 has a reference terminal 1222*r*, an input terminal 1222*a* and an output terminal 1222*b*, wherein the reference terminal 1222*r* is electrically coupled to the clock signal generator 1221, and the input terminal 1222*a* is electrically coupled to the first optical-signal filtering circuit 121, for example, electrically coupled to the optical coupler 1212 of the first optical-signal filtering circuit 121, and the output terminal 1222*b* is electrically coupled to the time-to-digital conversion unit 130. The third amplifier 1222 could correspondingly output a high-level signal according to the pulse of the reflected-light signal $S'_R$ whose signal intensity is higher than the pulse voltage value $V_C$. Further examples are given below.

As shown in FIG. 3A, the optical coupler 1212 has a first input terminal 1212*a*, a second input terminal 1212*b* and an output terminal 1212*c*, wherein the first input terminal 1212*a* is coupled to the output terminal 1211*b* of the second amplifier 1211 for receiving the turn-off signal $S_{OFF}$ and/or the turn-on signal $S_{ON}$. The second input terminal 1212*b* is coupled to the first amplifier 112 for receiving the reflected-light signal $S_R$. The output terminal 1212*c* is coupled to the input terminal 1222*a* of the third amplifier 1222, so that the reflected-light signal $S'_R$ could be input to the input terminal 1222*a*.

As shown in FIGS. 3A, 3D to 3E, the clock signal generator 1221 is configured for generating the clock signal $S_C$, wherein the clock signal $S_C$ has at least one clock pulse $P_C$. The third amplifier 1222 could receive the input of the clock signal $S_C$ and the reflected-light signal $S'_R$ and is configured for generating the reflected-light signal S"R according to the clock signal $S_C$ and the reflected-light signal S'R. The third amplifier 1222 is configured to output a second reflected pulse $P'_R$ (high-level signal) when the reflected-pulse voltage value $V_{PR}$ of the first reflected pulse $P_R$ of the reflected optical-signal $S_R$ is higher than the pulse voltage value $V_C$ of the clock pulse $P_C$, and not to output the second reflected pulse $F_R$ when the second interference voltage $V_{N2}$ of the second interference pulse $P_{N2}$ is lower than the pulse voltage value $V_C$, but may output a low-level signal, for example, 0 V. As a result, as shown in FIG. 3E, the signal within the range of a clock pulse width $W_{PC}$ of the clock pulse $P_C$ (for example, the first reflected pulse $P_R$ in FIG. 3C, whose signal intensity is higher than the pulse voltage value $V_C$) correspondingly appears in the reflected-light signal $S''_R$, while signals outside the range of the clock pulse width $W_{PC}$ of the clock pulse $P_C$ (for example, the second interference pulse $P_{N2}$ in FIG. 3C) do not appear in the reflected-light signal $S'''_R$.

In addition, the voltage value of the second reflected pulse $F_R$ is, for example, a specification voltage that conforms to the processing method of the time-to-digital conversion unit 130, for example, 3.3 V to 5 V; however, such exemplification is not meant to be for limiting. In addition, when the clock pulse width $W_{PC}$ is greater, the farther signal could be received. The clock pulse width $W_{PC}$ may depend on the characteristics/specifications of the optical radar 100; however, such exemplification is not meant to be for limiting.

As shown in FIG. 3A, the aforementioned clock signal $S_C$ is generated according to a clock frequency $f_{PC}$ and the clock pulse width $W_{PC}$. For example, the clock signal $S_C$ includes a plurality of clock pulses $P_C$. A occurrence frequency of the clock pulses $P_C$ is the clock frequency $f_{PC}$, and the width of each clock pulse $P_C$ is the clock pulse width $W_{PC}$. In an embodiment, the clock frequency $f_{PC}$ and the clock pulse width $W_{PC}$ are generated by the control unit 140 and transmitted to the optical-signal pickup unit 120. The values of the clock frequency $f_{PC}$ and the clock pulse width $W_{PC}$ may depend on the setting parameters of the light-emitting unit 105; however, such exemplification is not meant to be for limiting. Before transmitting the clock frequency $f_{PC}$ and the clock pulse width $W_{PC}$, the control unit 140 may encode the clock frequency $f_{PC}$ and the clock pulse width $W_{PC}$, wherein the encoded clock frequency $f_{PC}$ and the clock pulse width $W_{PC}$ could avoid being affected by the environment (for example, in-vehicle system or in-vehicle environment) interference. The decoding unit 223 is coupled to the control unit 140 and the second optical-signal filtering circuit 122, for example, coupled to the control unit 140 and the clock signal generator 1221 of the second optical-signal filtering circuit 122. The decoding unit 223 could decode the encoded clock frequency $f_{PC}$ and clock pulse width $W_{PC}$ to obtain the clock frequency $f_{PC}$ and the clock pulse width $W_{PC}$, and transmit the clock frequency $f_{PC}$ and the clock pulse width $W_{PC}$ to the clock signal generator 1221. The clock signal generator 1221 generates the clock signal $S_C$ based on the clock frequency $f_{PC}$ and the clock pulse width $W_{PC}$. The clock frequency $f_{PC}$ and the clock pulse width $W_{PC}$ are fixed in value and periodically generated, and do not change due to interference. Thus, the clock frequency $f_{PC}$ and the clock pulse width $W_{PC}$ could be regarded as time reference points, filter the reflected pulse $P_R$, and provide a time filtering way.

In addition, as shown in FIG. 3A, the detection light $L_D$ emitted by the light-emitting unit 105 has a light-emitting frequency $f_{LD}$. The control unit 140 generates the clock frequency $f_{PC}$ according to the light-emitting frequency $f_{LD}$. In an embodiment, the lighting frequency $f_{LD}$ is equal to the clock frequency $f_{PC}$, for example, 100 KHz or other frequency value. The control unit 140 is electrically coupled to the second optical-signal filtering circuit 122, for example, electrically coupled to the clock signal generator 1221 of the second optical-signal filtering circuit 122. After the optical radar 100 is activated, the control unit 140 could transmit the clock frequency $f_{PC}$ and the clock pulse width $W_{PC}$ to the clock signal generator 1221. The clock signal generator 1221 could pre-store the clock frequency $f_{PC}$ and the clock pulse width $W_{PC}$. When the clock signal generator 1221 receives a signal generating command S1 from the control unit 140, the clock signal generator 1221 generates the clock signal $S_C$ based on the signal generating command S1.

As shown in FIG. 3A, the third amplifier 1222 calculates the clock signal $S_C$ with the reflected-light signal $S'_R$ under the clock signal $S_C$ corresponding the reflected-light signal $S'_R$ in time point (for example, called "lock"). Further examples are given below.

As shown in FIGS. 3A, 3B and 3D to 3E, the control unit 140 is electrically coupled to the optical-signal receiving unit 110 and is configured to obtain a time point $t_{PR1}$ of the $1^{st}$ first reflected pulse $P_{R1}$ of the reflected optical-signal $S_R$ of the reflected light $L_R$ (the time point $t_{PR1}$ is shown in FIG. 3B); and control the second optical-signal filtering circuit 122 to generate the clock signal $S_C$ based on the time point $t_{PR1}$, wherein the time point $t_{PC1}$ (the time point $t_{PC1}$ is shown in FIG. 3D) of the first clock pulse $P_{C1}$ of the clock signal $S_C$ corresponds to the time point $t_{PR1}$ of the $1^{st}$ first reflected pulse $P_{R1}$ of the reflected optical-signal $S_R$ of the reflected light $L_R$. For example, as shown in FIGS. 3D and 3E, the clock pulse $P_{C1}$ wraps the reflected pulse $F_R$ at the time point $t_{PR1}$ or the time point $t_{PR1}$ is located within the range of the clock pulse width $W_{PC}$.

Furthermore, as shown in FIGS. 3A and 3B, when the control unit 140 detects the $1^{st}$ first reflected pulse $P_{R1}$ of the reflected-light signal $S_R$, simultaneously transmits the signal generating command S1 to the clock signal generator 1221. The clock signal generator 1221 generates the clock signal $S_C$ (the clock signal $S_C$ is shown in FIG. 3C) based on the clock frequency $f_{PC}$ and the clock pulse width $W_{PC}$. As shown in FIG. 3C, the clock signal $S_C$ includes a plurality of clock pulses $P_C$, wherein the time point of the first clock pulse $P_{C1}$ is set as $t_{PC1}$, which is corresponding to or is the same as the time point $t_{PR1}$ of the $1^{st}$ first reflected pulse $P_{R1}$. As a result, after the clock signal $S_C$ and the reflected-light signal $S'_R$ are input to the third amplifier 1222, the third amplifier 1222 outputs a second reflected pulse $P'_R$ (the second reflected pulse $P'_R$ is shown in FIG. 3E) corresponding to the first reflected pulse $P_R$ when the first reflected pulse $P_R$ of the reflected-light signal $S'_R$ corresponds to the clock pulse $P_C$ of the clock signal $S_C$ in time point from the reflected-light signal $S'_R$. In addition, when the second interference pulse $P_{N2}$ does not correspond to the clock pulse $P_C$ of the clock signal $S_C$ from the reflected-light signal $S'_R$, the third amplifier 1222 does not output the second reflected pulse $F_R$, but outputs a low-level signal that is different from the high-level signal of the second reflected pulse $F_R$.

To sum up, as shown in FIGS. 3C to 3E, in the reflected-light signal $S'_R$, the third amplifier 1222 outputs, only based on a pulse (for example, the first reflected pulse PR) overlapping in the clock pulse width $W_{PC}$ of the clock signal $S_C$ and the reflected-pulse voltage $V_{PR}$ of such pulse being higher than the pulse voltage $V_C$ of the clock pulse $P_C$, the second reflected pulse $F_R$ (high-level signal) corresponding to such pulse. However, in the reflected-light signal $S'_R$, for based on a pulse (for example, the second interference pulse $P_{N2}$) not overlapping in the clock pulse width $W_{PC}$ of the clock signal $S_C$ and the reflected-pulse voltage $V_{PR}$ of such pulse being lower than the pulse voltage $V_C$ of the clock pulse $P_C$, the third amplifier 1222 does not output the corresponding second reflected pulse $F_R$.

In addition, the reflected-light signal $S_R$ is continuously input to the control unit 140. After the control unit 140 obtains the time point $t_{PR1}$ of the 1st first reflected pulse $P_{R1}$, it could no longer use and/or process the reflected-light signal $S_R$, and only purely receives the reflected-light signal $S_R$.

Figure 4:
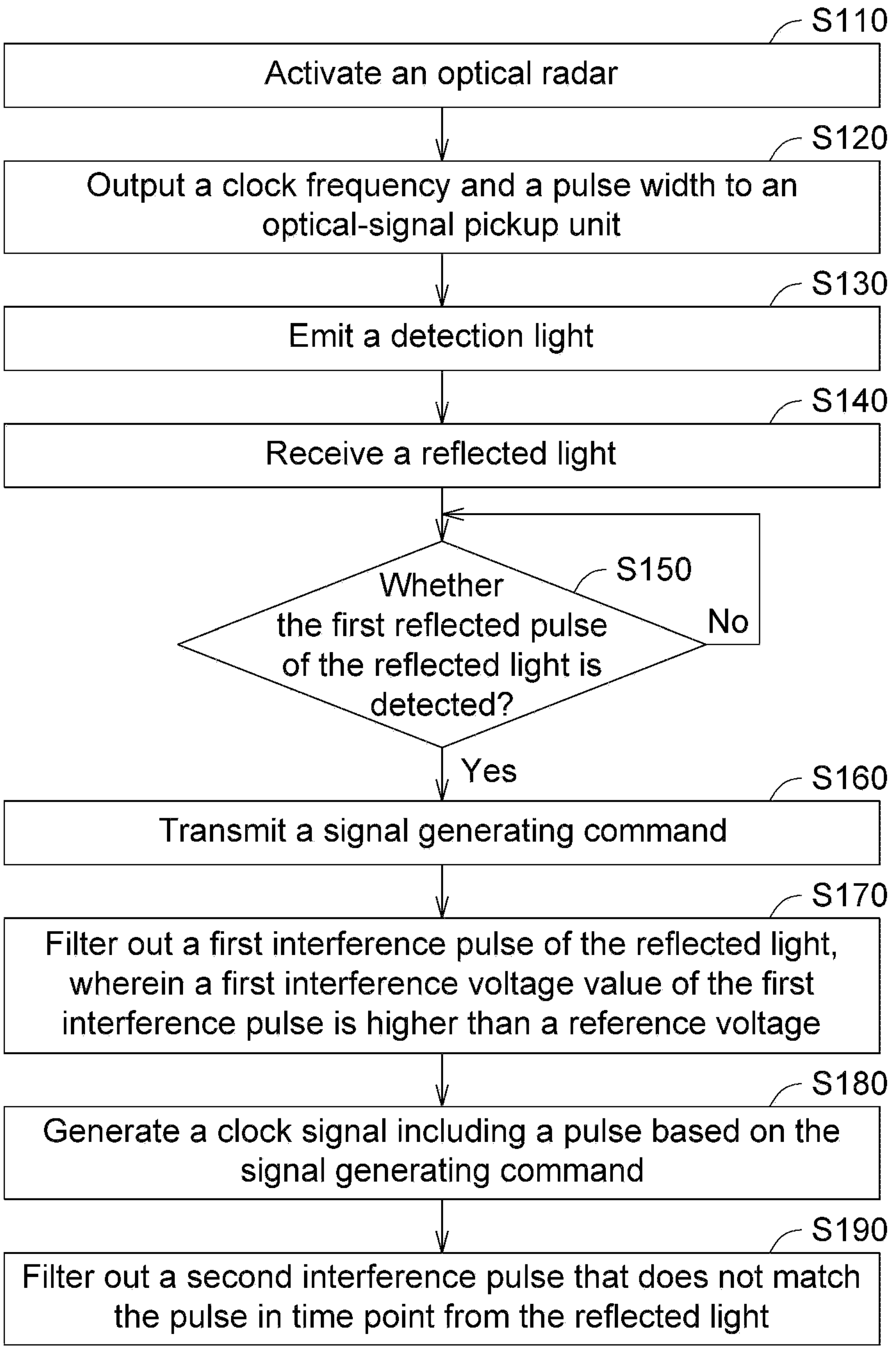
FIG. 4 shows a flowchart of an optical-signal pickup method of the optical radar of FIG. 3A.

Referring to FIG. 4, FIG. 4 shows a flowchart of an optical-signal pickup method of the optical radar 200 of FIG. 3A. The optical-signal pickup method of the optical radar 100 in FIG. 2 includes the process steps same as or similar to that of FIG. 4, and the similarities will not be repeated hereafter.

In step S110, an optical radar 200 is activated. Furthermore, an activation system (not shown) activates the optical radar 200 according to a user's instruction. The activation system is, for example, an in-vehicle electronic control system.

In step S120, as shown in FIG. 3A, after the optical radar 200 is activated, the control unit 140 outputs the clock frequency $f_{PC}$ and the pulse width $W_{PC}$ to the optical-signal pickup unit 120, for example, the clock signal generator 1221 of the optical-signal pickup unit 120. The control unit 140 generates the clock frequency $f_{PC}$ and the clock pulse width $W_{PC}$ according to the setting parameters for the light-emitting unit 105.

As shown in FIG. 3A, after the clock signal generator 1221 receives the clock frequency $f_{PC}$ and the clock pulse width $W_{PC}$, the clock signal generator 1221 stores the clock frequency $f_{PC}$ and the clock pulse width $W_{PC}$. In an embodiment, the control unit 140 could encode the clock frequency $f_{PC}$ and the clock pulse width $W_{PC}$, and the encoded clock frequency $f_{PC}$ and the clock pulse width $W_{PC}$ could avoid being disturbed by the environment (for example, in-vehicle system or in-vehicle environment). The control unit 140 transmits the encoded clock frequency $f_{PC}$ and clock pulse width $W_{PC}$ to the decoding unit 223. The decoding unit 223 could decode the encoded clock frequency $f_{PC}$ and clock pulse width $W_{PC}$ to obtain the clock frequency $f_{PC}$ and the clock pulse width $W_{PC}$, and then transmit the clock frequency $f_{PC}$ and the clock pulse width $W_{PC}$ to the clock signal generator 1221.

In step S130, as shown in FIG. 3A, the light-emitting unit 105 emits the detection light $L_D$.

The aforementioned steps S110 to S130 may be performed almost simultaneously.

In step S140, as shown in FIGS. 3A and 3B, the optical-signal receiving unit 110 receives the reflected light $L_R$, wherein the reflected-light signal $S_R$ of the reflected light $L_R$ includes the first reflected pulse $P_R$ of the reflected light $L_{DR}$ of the detection light $L_D$ emitted by the optical radar 200 itself, the first interference pulse $P_{N1}$ (stronger intensity) of the detection light L'D emitted by the optical radar 100' (the optical radar 100' is shown in FIG. 1) and the second interference pulse $P_{N2}$ (weaker intensity) of other light.

In step S150, as shown in FIG. 3A, the control unit 140 determines whether the $1^{st}$ first reflected pulse $P_{R1}$ of the reflected-light signal $S_R$ is detected (the first reflected pulse $P_{R1}$ is shown in FIG. 3B); if so, the process proceeds to step S160; if not, the process returns to step S150, and the control unit 140 continues to determine whether the $1^{st}$ first reflected pulse $P_{R1}$ of the reflected-light signal $S_R$ is detected.

In step S160, as shown in FIG. 3A, the control unit 140 transmits the signal generating command S1 to the clock signal generator 1221.

In step S170, as shown in FIGS. 3A to 3C, the first optical-signal filtering circuit 121 filters out the first interference pulse $P_{N1}$ of the reflected light $L_R$, wherein the first interference voltage value $V_{N1}$ of the first interference pulse $P_{N1}$ is higher than the reference voltage $V_{ref}$. The process in which the first optical-signal filtering circuit 121 filters out the first interference pulse $P_{N1}$ has been described above, and it will not be repeated herein again.

In step S180, as shown in FIGS. 3A and 3D, the clock signal generator 1221 generates the clock signal $S_C$ based on the signal generating command S1. The clock signal $S_C$ includes a plurality of the clock pulses $P_C$. A occurrence frequency of the clock pulses $P_C$ is the clock frequency $f_{PC}$ and the width of each clock pulse $P_C$ is the clock pulse width $W_{PC}$.

In step S190, as shown in FIGS. 3A, 3D and 3E, the second optical-signal filtering circuit 122 filters out the second interference pulse $P_{N2}$ that does not match the pulse in time point from the reflected light $L_R$. For example, the second optical-signal filtering circuit 122 filters out the second interference pulse $P_{N2}$ (the second interference pulse $P_{N2}$ is shown in FIG. 3C) outside the clock pulse $P_C$ (the clock pulse $P_C$ is shown in FIG. 3D). The way in which the second optical-signal filtering circuit 122 filters out the second interference pulse $P_{N2}$ has been described above, and it will not be repeated herein again.

Other embodiments/steps of the optical-signal pickup method of the optical radar 200 have been described above, and it will not be repeated here.

To sum up, in an optical radar and an optical-signal pickup method of an embodiment of the present disclosure, the first interference pulse of the reflected-light signal whose intensity (for example, the voltage value) is higher than the reflected pulse or the reference voltage is filtered out firstly, and then the second interference pulse that does not match the clock pulse of the clock pulse in time point from the reflected-light signal is filtered out. As a result, most, almost or all of the remaining pulses in the reflected-light signal are the reflected pulses, reflected by the reflector, of the detection light emitted by the optical radar itself, and such reflected pulses are of meaningful signal which could increase the accuracy of the point-cloud map produced based on the reflected-light signal and improve the anti-interference performance of the optical radar in the self-driving vehicle and/or the anti-interference performance of a machine vision in the driving assistance system.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical radar, comprising:

an optical-signal receiving unit configured to receive a reflected light; and an optical-signal pickup unit coupled to the optical-signal receiving unit, and comprising:

a first optical-signal filtering circuit configured to remove a first interference pulse from the reflected light, wherein the first interference pulse has a first interference voltage value higher than a reference voltage; and a second optical-signal filtering circuit coupled to the first optical-signal filtering circuit and configured to:

generate a clock signal comprising a clock pulse; and remove a second interference pulse that does not match the clock pulse in time point from the reflected light;

wherein the optical radar further comprises:

a control unit coupled to the optical-signal pickup unit and the optical-signal receiving unit, and configured to:

obtain a time point of a first reflected pulse of the reflected light; and control the second optical-signal filtering circuit to generate the clock signal based on the time point of the of the first reflected pulse;

wherein a time point of the clock pulse of the clock signal corresponds to the time point of the first reflected pulse of the reflected light.

2. The optical radar according to claim 1, wherein the second interference pulse has a second interference voltage value lower than the first interference voltage value of the first interference pulse.

3. The optical radar according to claim 1, wherein the optical-signal receiving unit comprises:

a photodiode configured to sense the reflected light and output a reflected-light signal in response; and a first amplifier coupled to the photodiode and configured to amplify the reflected-light signal.

4. The optical radar according to claim 1, wherein the first optical-signal filtering circuit comprises:

an amplifier configured to:

receive a reflected-light signal of the reflected light and coupled to the reference voltage; and output a turn-off signal when the first interference voltage value of the first interference pulse of the reflected-light signal is higher than the reference voltage; and an optical coupler coupled to the amplifier and the reflected-light signal, and configured to:

block an output of the first interference pulse in response to receiving the turn-off signal.

5. The optical radar according to claim 4, wherein the amplifier is further configured to output a turn-on signal when a reflected-pulse voltage value of the first reflected pulse of the reflected-light signal is not higher than the reference voltage; the optical coupler is further configured to conduct an output of the first reflected pulse in response to receiving the turn-on signal.

6. The optical radar according to claim 1, wherein the reference voltage ranges between the first interference voltage value of the first interference pulse and a second interference voltage value of the second interference pulse.

7. The optical radar according to claim 1, wherein the second optical-signal filtering circuit comprises:

a clock signal generator configured to generate the clock signal comprising the clock pulse; and an amplifier configured to receive the clock signal and a reflected-light signal of the reflected light and configured to:

output a second reflected pulse when a reflected-pulse voltage value of the first reflected pulse of the reflected-light signal is higher than a pulse voltage value of the clock pulse; and not output the second reflected pulse when the second interference voltage value of the second interference pulse is lower than the pulse voltage value.

8. The optical radar according to claim 7, wherein the clock signal has a clock frequency, and the optical radar further comprises:

a light-emitting unit configured to emit a detection light having a light-emitting frequency;

wherein the clock frequency is equal to the light-emitting frequency.

9. The optical radar according to claim 1, wherein a reflected-light signal of the reflected light comprises a plurality of the first reflected pulses, and the optical radar further comprises:

a time-to-digital conversion unit (TDC) coupled to the optical-signal pickup unit and configured to obtain at least one time difference of the first reflected pulses.

10. The optical radar according to claim 1, wherein the control unit is configured to output a clock frequency and a clock pulse width to the optical-signal pickup unit;

wherein the optical-signal pickup unit is configured to generate the clock signal based on the clock frequency and the clock pulse width, the clock signal comprises a plurality of the clock pulses, the clock pulses have the clock frequency, and each clock pulse has the clock pulse width.

11. The optical radar according to claim 10, wherein the control unit is further configured to:

transmit a signal generating command to the clock signal generator when the first reflected pulse of the reflected light is detected;

wherein the clock signal generator is configured to generate the clock signal in response to the signal generating command.

12. An optical-signal pickup method for an optical radar, comprising:

receiving a reflected light;

removing a first interference pulse from the reflected light, wherein the first interference pulse has a first interference voltage value higher than a reference voltage;

obtain a time point of a first reflected pulse of the reflected light;

generating a clock signal based on the time point of the first reflected pulse, wherein the clock signal comprises a clock pulse;

removing a second interference pulse that does not match the clock pulse in time point from the reflected light;

wherein a time point of the clock pulse of the clock signal corresponds to the time point of the first reflected pulse of the reflected light.

13. The optical-signal pickup method according to claim 12, wherein the second interference pulse has a second interference voltage value lower than the first interference voltage value of the first interference pulse.

14. The optical-signal pickup method according to claim 12, further comprising:

sensing the reflected light and outputting a reflected-light signal in response; and amplifying the reflected-light signal.

15. The optical-signal pickup method according to claim 12, further comprising:

outputting a turn-off signal when the first interference voltage value of the first interference pulse of a reflected-light signal is higher than the reference voltage; and blocking an output of the first interference pulse in response to the turn-off signal.

16. The optical-signal pickup method according to claim 15, further comprising:

outputting a turn-on signal when a reflected-pulse voltage value of the first reflected pulse of the reflected-light signal is not higher than the reference voltage; and conducting an output of the first reflected pulse in response to the turn-on signal.

17. The optical-signal pickup method according to claim 12, wherein the reference voltage ranges between the first interference voltage value of the first interference pulse and a second interference voltage value of the second interference pulse.

18. The optical-signal pickup method according to claim 12, further comprising:

outputting a second reflected pulse when a reflected-pulse voltage value of the first reflected pulse of a reflected-light signal is higher than a pulse voltage value of the clock pulse; and not outputting the second reflected pulse when a second interference voltage value of the second interference pulse is lower than the pulse voltage value.

19. The optical-signal pickup method according to claim 18, wherein the clock signal has a clock frequency, and the optical-signal pickup method further comprises:

emitting a detection light having a light-emitting frequency;

wherein the clock frequency is equal to the light-emitting frequency.

20. The optical-signal pickup method according to claim 12, wherein a reflected-light signal of the reflected light comprises a plurality of the first reflected pulses, and the optical-signal pickup method further comprises:

obtaining at least one time difference of the first reflected pulses.

21. The optical-signal pickup method according to claim 12, further comprising:

outputting a clock frequency and a clock pulse width; and generating the clock signal based on the clock frequency and the clock pulse width, wherein the clock signal comprises a plurality of the clock pulses, the clock pulses have the clock frequency, and each clock pulse has the clock pulse width.

22. The optical-signal pickup method according to claim 12, further comprising:

transmitting a signal generating command when the first reflected pulse of the reflected light is detected; and generating the clock signal in response to the signal generating command.

* * * * *